(12) United States Patent
Aupetitgendre et al.

(10) Patent No.: US 9,546,686 B2
(45) Date of Patent: Jan. 17, 2017

(54) ROLLING BEARING COMPRISING A SEALING FLANGE

(71) Applicants: Elie Aupetitgendre, St-Cyr-sur Loire (FR); Stellario Barbera, Hilversum (NL); Michel Organisciak, Utrecht (NL); Laurent Varnoux, Saint Avertin (FR)

(72) Inventors: Elie Aupetitgendre, St-Cyr-sur Loire (FR); Stellario Barbera, Hilversum (NL); Michel Organisciak, Utrecht (NL); Laurent Varnoux, Saint Avertin (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/968,976

(22) Filed: Dec. 15, 2015

(65) Prior Publication Data

US 2016/0169287 A1    Jun. 16, 2016

(30) Foreign Application Priority Data

Dec. 15, 2014 (FR) .................................... 14 62425

(51) Int. Cl.
*F16C 33/76* (2006.01)
*F16C 33/78* (2006.01)
*F16C 33/66* (2006.01)

(52) U.S. Cl.
CPC ....... *F16C 33/7886* (2013.01); *F16C 33/6607* (2013.01); *F16C 33/763* (2013.01);
(Continued)

(58) Field of Classification Search
CPC . F16C 33/6607; F16C 33/782; F16C 33/7823; F16C 33/7826; F16C 33/7863; F16C 33/7879; F16C 33/7886; F16C 33/7896; F16C 33/7859; F16J 15/3264
See application file for complete search history.

(56) References Cited

U.S. PATENT DOCUMENTS 3,639,016 A * 2/1972 Bourgeois ........... F16C 33/6618
                                                    277/349
4,632,404 A * 12/1986 Feldle ................. F16C 33/7859
                                                    277/348

(Continued)

FOREIGN PATENT DOCUMENTS

DE       1042308 B       10/1958
DE       2215028 A1      10/1973
WO    2010/133240 A1    11/2010

*Primary Examiner* — Phillip A Johnson
(74) *Attorney, Agent, or Firm* — Bryan Peckjian; SKF USA Inc. Patent Dept.

(57) ABSTRACT

A rolling bearing comprising an outer ring, an inner ring, at least one row of rolling elements that are disposed radially between the rings, at least one seal forming a first sealing component that is fixed to one of the rings and engages with the other ring, and at least one flange forming a second sealing component that is fixed to the other ring and is offset axially with respect to the seal on the outer side of the bearing. At least one of the first and second sealing components comprises at least two annular ribs, the other sealing component being mounted axially in contact therewith. At least one closed annular space is delimited by the ribs and by the other sealing component. At least one lubricant is disposed inside the space.

10 Claims, 5 Drawing Sheets

(52) U.S. Cl.
CPC ........ *F16C 33/782* (2013.01); *F16C 33/7863* (2013.01); *F16C 33/7896* (2013.01)

(56) References Cited

U.S. PATENT DOCUMENTS

| | | | | |
|---|---|---|---|---|
| 4,792,242 | A | * 12/1988 | Colanzi | F16C 33/7859 384/478 |
| 2009/0226124 | A1 | * 9/2009 | Nakagawa | F16C 33/7853 384/478 |
| 2011/0133412 | A1 | 6/2011 | Mause et al. | |

* cited by examiner

ROLLING BEARING COMPRISING A SEALING FLANGE

CROSS REFERENCE TO RELATED APPLICATION

This is a Non-Provisional patent application, filed under the Paris Convention, claiming the benefit of France (FR) Patent Application Number 1462425, filed on 15 Dec. 2014, which is incorporated herein by reference in its entirety.

FIELD OF THE INVENTION

The present invention relates to the field of rolling bearings and in particular those used in automotive or industrial applications.

BACKGROUND OF THE INVENTION

In a rolling bearing, one or more seals are generally used to keep the lubricant, such as grease, inside the bearing and to limit the ingress of contaminating particles. Generally, such seals are fixed to one of the rings of the bearing and engage with the other ring so as to form a dynamic seal.

Patent application WO-A1-2010/133240 (SKF) describes a rolling bearing comprising two seals that are fixed to the outer ring and each comprise an internal lip in rubbing contact with the inner ring. The bearing also comprises two sealing flanges that are fixed to the inner ring and against each of which an external lip of the associated seal rubs.

The use of such a flange that is axially on each side of the bearing and engages with the external lip of the associated seal makes it possible to limit contaminating particles reaching the internal lip of the seal in rubbing contact with the inner ring. However, the contact pressure exerted on the flange by the elastomeric external lip of each associated seal tends to decrease over time and in the event of angular misalignment of one of the rings with respect to the other following mounting of the bearing. This can affect the sealing properties of the bearing in operation.

SUMMARY OF THE INVENTION

The present invention aims to remedy this drawback.

More specifically, the present invention seeks to provide a rolling bearing that has an improved seal.

The present invention also aims to provide a rolling bearing that is easy to manufacture and assemble.

In one embodiment, the rolling bearing comprises an outer ring, an inner ring, at least one row of rolling elements that are disposed radially between the rings, at least one seal forming a first sealing element that is fixed to one of the rings and engages with the other ring, and at least one sealing flange forming a second sealing element that is fixed to the other ring and is offset axially with respect to the seal on the outer side of the bearing.

At least one of the first sealing element and the second sealing element comprises at least two annular ribs, the other sealing element being mounted axially in contact therewith. At least one closed annular space is delimited by the ribs and by the other sealing element. At least one lubricant is disposed inside the space.

The axial contact between the ribs of one of the sealing element and the other sealing element makes it possible to limit the intrusion of contaminating particles between these sealing elements. Moreover, the annular space formed radially between the ribs and inside which the lubricant is disposed makes it possible to maintain good sealing properties over time in the contact zone of the two sealing elements. The number of contaminating particles that reach a portion of the sealing element engaging with the other ring in order to form a dynamic seal is limited.

In one particular embodiment, the flange is elastically deformable at least in part in the axial direction, the flange being deformed axially by the axial contact with the seal.

The axial deformation of the flange combined with its elastic nature makes it possible to maintain axial contact with the seal. In reaction to the deformation of the flange counter to its elasticity, the flange exerts a permanent axial preloading force on the seal. The space delimited by the ribs and by the other sealing element is permanently maintained in the closed state. This maintains good sealing properties.

Preferably, the thickness of each rib decreases in the direction of its free end which is in axial contact with the other sealing element. Thus, the friction torque between the two sealing elements is reduced.

In one embodiment, the ribs extend axially. The ribs may be identical to one another. Advantageously, the ribs are in one piece with the sealing element. In one embodiment, each rib has a triangular shape in cross section.

In one embodiment, the ribs are formed on an external side face of the seal. Alternatively or in combination, the ribs are formed on an internal side face of the flange. The seal may comprise at least one sealing gasket delimiting the external side face. In one embodiment, the seal comprises a reinforcing insert covered at least in part by the sealing gasket.

Preferably, the sealing gasket is made from a flexible material and the flange is made from a rigid material. The sealing flange may be made from a metal material. This makes it possible to facilitate the dissipation of heat which is generated by the axial sliding contact between the flange and the associated seal.

Preferably, the external side face of the seal is axially offset on the inner side of the bearing with respect to a front surface of the ring.

The flange may comprise a portion bearing on the seal which has a convex shape axially on the side of the seal. Thus, the friction torque between the seal and the associated flange is reduced. In addition, any contact between a sharp end edge of the bearing portion of the flange and the seal is prevented so as to inhibit any deterioration of the seal.

Preferably, the flange comprises a fixing portion for fixing the flange to the other ring and a connecting portion connecting the fixing portion and the bearing portion in contact with the seal, at least the connecting portion being elastically deformable in the axial direction. The connecting portion may extend inwards in the direction of the seal. In one embodiment, the connecting portion has a curved shape.

In one embodiment, the flange comprises at least one undulation that is separate from the bearing portion and extends axially. The bearing portion may extend axially on the outer side of the bearing or alternatively axially on the inner side of the bearing.

Preferably, the seal is axially offset on the inner side of the bearing with respect to a front surface of the ring. In one embodiment, the flange may be mounted axially in a manner bearing directly against a front surface of the ring.

BRIEF DESCRIPTION OF THE FIGURES

The present invention will be better understood from reading the detailed description of embodiments which are given by way of entirely non-limiting example and are illustrated by the appended drawings, in which.

DETAILED DESCRIPTION OF THE EMBODIMENTS

Figure 1:
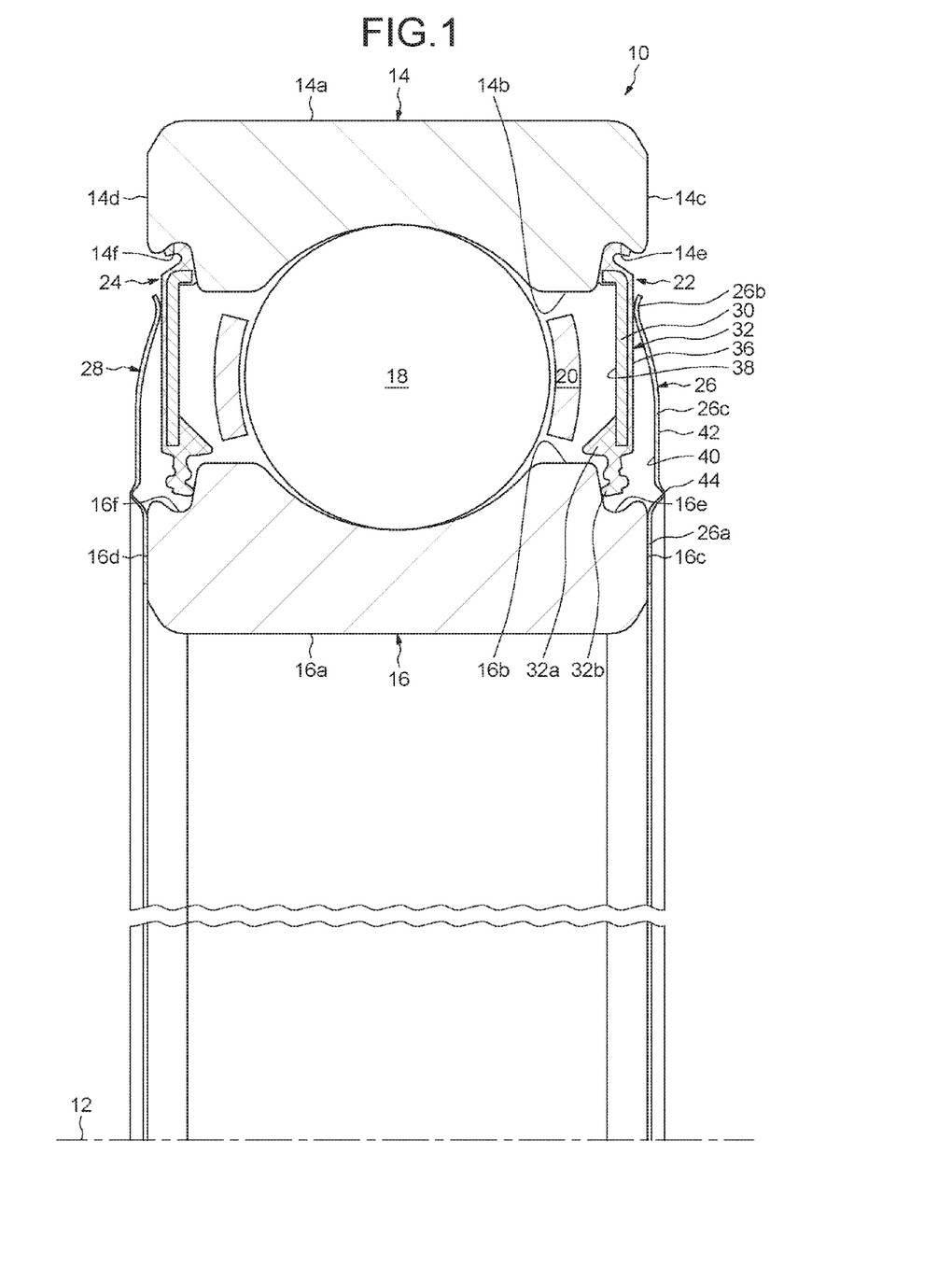
FIG. 1 is a half view in axial section of a rolling bearing according to a first example of the invention.

In FIG. 1, a rolling bearing 10, of axis 12, comprises an outer ring 14, an inner ring 16, a plurality of rolling elements 18, in this case in the form of balls that are disposed radially between the rings and a cage 20 for maintaining the regular circumferential spacing of the rolling elements. The bearing 10 comprises, axially on each side, an annular seal 22, 24 for closing the radial space that exists between the outer ring 14 and inner ring 16, and an annular sealing flange 26, 28 that bears axially against the seal 22, 24 on the outer side of the bearing. In the illustrated example, the seals 22, 24 are fixed to the outer ring 14, while the sealing flanges 26, 28 are fixed to the inner ring 16.

The outer ring 14 comprises a cylindrical axial outer surface 14a, a cylindrical bore 14b, two opposite radial front surfaces 14c, 14d that axially delimit the bore and the outer surface, and a raceway that is formed on the bore 14b and has in cross section a concave internal profile suitable for the rolling elements 18, the raceway being directed radially inwards. The outer ring 14 also comprises two annular grooves 14e, 14f that are formed in the bore 14b and extend radially outwards. The grooves 14e, 14f are disposed respectively in the vicinity of the front surfaces 14c, 14d. Each groove 14e, 14f is disposed axially between the rolling elements 18 and one of the front surfaces 14c, 14d. The grooves 14e, 14f are mutually symmetric about a radial median plane passing through the centre of the bearing 10.

The inner ring 16 comprises a cylindrical bore 16a, a cylindrical axial outer surface 16b, two opposite radial front surfaces 16c, 16d that axially delimit the bore and the outer surface, and a raceway that is formed on the outer surface 16b and has in cross section a concave internal profile suitable for the rolling elements 18, the raceway being directed radially outwards. The cage 20 is disposed radially in the radial space delimited by the outer surface 16b of the inner ring and the bore 14b of the outer ring.

The inner ring 16 also comprises two annular grooves 16e, 16f that are formed in the outer surface 16b and extend radially inwards. The grooves 16e, 16f are disposed respectively in the vicinity of the front surfaces 16c, 16d. The grooves 16e, 16f are mutually symmetric about a radial median plane of the bearing 10. The groove 16e, 16f is radially opposite the corresponding groove 14e, 14f.

The outer ring 14 and inner ring 16 are concentric. In the illustrated example, the rings are solid. A "solid ring" is understood to be a ring of which the shape is obtained by machining with removal of chips (by turning or grinding) from tubes, bar stock, forged and/or rolled blanks.

Each seal 22, 24 is disposed radially between the outer ring 14 and inner ring 16 and fixed to the outer ring, being disposed laterally with respect to the rolling elements 18. Each seal 22, 24 is fixed inside one of the grooves 14e, 14f in the outer ring. Each seal 22, 24 is housed entirely inside the radial space delimited by the outer ring 14 and inner ring 16. Each seal 22, 24 is axially offset on the inner side of the bearing 10 with respect to the associated side surface 14c, 14d of the outer ring.

In this illustrated example, the seals 22, 24 are identical to one another and symmetric with respect to the radial median plane of the bearing 10. Since the seals 22, 24 are identical here, only one of them will be described.

The seal 22 comprises a rigid annular armature or insert 30 and a flexible annular sealing gasket 32 fixed to the insert. The insert 30 is made from a rigid material, for example from metal material or thermoplastic material, in particular polyamide. The insert 30 forms a reinforcing insert for the gasket 32. The gasket 32 is molded or vulcanized onto the insert 30. The gasket 32 is made from a flexible material, for example elastomer such as a nitrile rubber or thermoplastic elastomer material.

The gasket 32 covers an outer surface of the insert 30. The gasket 32 covers an external side face of the insert 30. The gasket 32 comprises an annular external side face 36 that is oriented axially on the outer side of the bearing 10 in the direction of the associated flange 26. The external side face 36 is axially offset on the inner side of the bearing 10 with respect to the front surfaces 14c, 16c of the outer ring and inner ring. The side face 36 of the gasket forms the external side face of the seal 22. The side face 36 is flat. The side face 36 extends radially. An internal side face 38 of the seal away from the side face 36 is oriented axially towards the inside of the bearing in the direction of the rolling elements 18. The internal side face 38 is delimited by the insert 30.

The gasket 32 forms two radially opposite sealing portions that respectively bring about a static seal with the outer ring 14 and a dynamic seal with the inner ring 16. A "static seal" is understood to mean the seal produced between two components without relative movement and a "dynamic seal" is understood to mean a seal between two components exhibiting relative movement.

The outer sealing portion of the gasket 32 is force-fitted into the groove 14e in the outer ring 14 in order to fix the seal 22 to the ring. In the region of the groove 14e, the outer sealing portion exhibits shape complementarily with the groove so as to form a means for fixing the seal 22 to the outer ring 14. The outer sealing portion radially and axially surrounds the large-diameter free edge of the insert 30 such that only the gasket 32 is in contact with the outer ring 14. In this way, the seal 22 is kept properly in position inside the groove 14e by force-fitting and by friction.

The inner sealing portion of the gasket 32 comprises first and second concentric annular internal lips 32a, 32b that extend axially towards the inside of the bearing. The internal lip 32b bears axially against a radial wall of the groove 16e in the inner ring. The internal lip 32a has a diameter greater than the internal lip 32b and radially surrounds the outer surface 16b of the inner ring so as to form a narrow passage of the labyrinth type with the outer surface.

Figure 2:
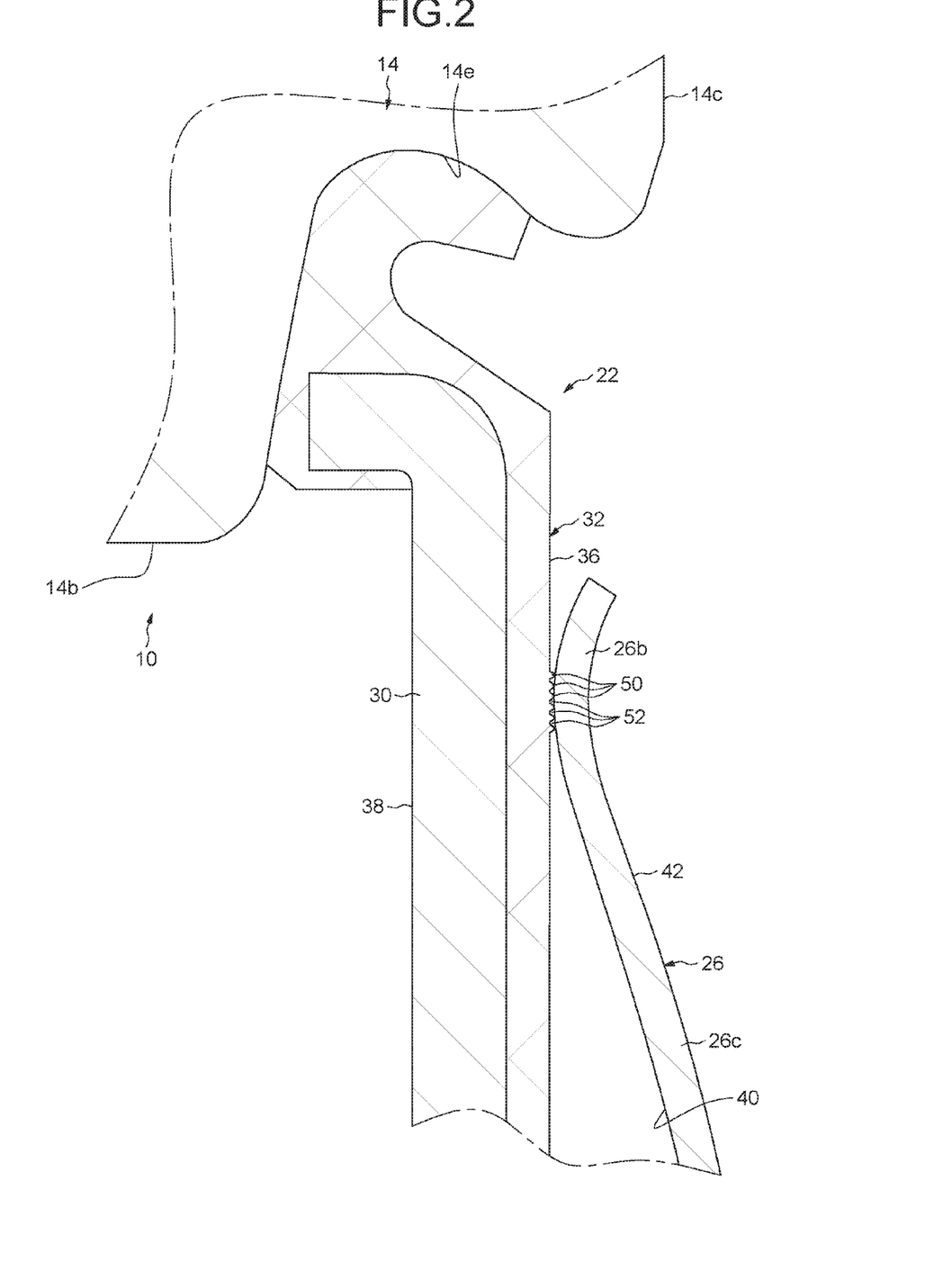
FIG. 2 is a detail view of FIG. 1.

As illustrated more clearly in FIG. 2, the external side face 36 of the seal comprises a plurality of annular ribs 50 that extend outwards in the direction of the sealing flange 26. The flange 26 is mounted so as to bear axially against the ribs 50.

The ribs 50 extend from the external side face 36 and bear axially against an internal side face 40 of the flange. The ribs 50 extend axially. The ribs 50 are situated axially on the side away from the internal lip 32b (FIG. 1) with respect to the external side face 36. The ribs 50 and the lip 32b are disposed axially on either side of the side face 36. The ribs 50 are offset axially towards the outside of the bearing 10 with respect to the lip 32b. In the illustrated example, the ribs 50 are offset radially towards the outside of the bearing 10 with respect to the lip 32b.

The ribs 50 are concentric with and identical to one another. In the illustrated example, there are six of the ribs 50. As a variant, it is possible to provide a different number of ribs while keeping at least two ribs, however. The ribs 50 are spaced apart in a regular manner with respect to one another in the radial direction here. The ribs 50 are produced integrally with the gasket 32 of the seal, i.e. in one piece. In the illustrated example, the thickness of each rib 50 decreases from the external side face 36 of the seal in the direction of its free end in axial rubbing contact with the flange 26. The free end of each rib 50 has a triangular shape in cross section here so as to reduce the friction torque between the seal 22 and the flange 26.

Referring again to FIG. 1, each sealing flange 26, 28 is offset axially with respect to the associated seal 22, 24 on the outer side of the bearing. Each sealing flange 26, 28 is mounted so as to bear axially against one of the front surfaces 16c, 16d of the inner ring and bears against the sealing gasket 32 of the associated seal axially on the outer side of the bearing 10. The flanges 26, 28 are mutually symmetric about the transverse radial plane passing through the centre of the bearing 10. Since the flanges 26, 28 are identical in the illustrated example, only one of them will be described here.

The flange 26 is made in one piece. The flange 26 is made from a rigid material, for example from metal material, advantageously from a sheet metal blank by cutting and pressing. Alternatively, the flange 26 may be made of some other rigid material, for example of synthetic material such as polyamide.

The flange 26 is fixed to the inner ring 16 and extends radially in the direction of the outer ring 14. The flange 26 is fixed to the inner ring 16 by any appropriate means, for example by adhesive bonding or welding. The flange 26 is mounted axially in contact with the front surface 16c of the inner ring. The flange 26 is fixed to this front surface 16c. In the illustrated example, the flange 26 is mounted in direct contact with the inner ring. Alternatively, it may be possible to axially interpose an intermediate element between the inner ring 16 and the flange 26.

The flange 26 bears axially against the external side face 36 of the seal. In the illustrated example, the flange 26 is mounted so as to bear axially against the side face 36 close to the outer sealing portion of the sealing gasket 32. The flange 26 comprises the internal side face 40 that is oriented axially on the side of the seal 22 and bears against the ribs 50 (FIG. 2) of the seal, and an external side face 42 that is oriented axially on the outer side of the bearing. The flange 26 is mounted in direct contact with the seal 22.

The flange 26 comprises an annular fixing portion 26a mounted so as to bear axially against the front surface 16c of the inner ring and a portion 26b for bearing against the seal 22 which has an annular shape and is in axial contact with the ribs 50 of the seal. The fixing portion 26a has a radial shape and forms an inner portion of the flange. The bearing portion 26b forms an external portion or end portion of the flange. In the illustrated example, the bearing portion 26b has a curved shape that is concave axially on the outer side and is convex axially on the inner side. Only the bearing portion 26b of the flange is mounted in contact with the seal 22.

The flange 26 also comprises an annular connecting portion 26c extending between the fixing portion 26a and bearing portion 26b, being connected to the portions. The connecting portion 26c radially extends the fixing portion 26a and is extended radially by the bearing portion 26b. The connecting portion 26c is designed to be flexible and elastically deformable in the axial direction. The connecting portion 26c extends inwards in the direction of the seal 22. In the illustrated example, the connecting portion 26c has a curved shape axially towards the inside of the bearing 10.

A wave or undulation 44 is formed on the connecting portion 26c so as to further promote the flexible and elastically deformable nature in the axial direction of this portion. The undulation 44 extends axially on the outer side of the bearing 10. In the illustrated example, the undulation 44 extends from the large-diameter edge of the fixing portion 26a of the flange. The flange 26 comprises a single undulation 44 here. Alternatively, the flange 26 could comprise a plurality of successive undulations in the radial direction or other shapes that promote the elastic deformation of the connecting portion 26c.

As indicated above, the flange 26 is mounted so as to bear axially against the ribs 50 of the seal (FIG. 2). The bearing portion 26b of the flange bears axially against the ribs 50. An annular space 52 is delimited radially between each pair of successive ribs 50. Each space 52 is delimited axially by the flange 26 and the seal 22. Each space 52 is delimited axially by the bearing portion 26b of the flange and the seal 22. Each space 52 is delimited axially by the internal side face 40 of the flange 26 and the external side face 36 of the seal. At least one lubricant (not shown), for example grease, is disposed inside each space 52. Each pair of ribs 50 defines with the flange 26 a space 52 that forms a reservoir which contains lubricant. The lubricant present inside each space 52 forms an annular bulge.

The axial contact between the flange 26 and the ribs 50 of the seal 22 makes it possible to limit the intrusion of contaminating particles between the flange and the seal. Moreover, the closed spaces 52 that are defined by the ribs 50 of the seal and the flange 26 and are filled with lubricant make it possible to obtain a proper seal in this region. The formation of sealing upstream of the dynamic sealing portion of the seal 22 which engages with the inner ring 16 is obtained. This makes it possible to limit the contaminating particles reaching the dynamic sealing portion of the seal.

In the illustrated example, the flange 26 is deformed axially towards the outside of the bearing by the contact between the bearing portion 26b and the ribs 50 of the seal 22. The connecting portion 26c of the flange is deformed counter to its inherent elasticity. The flange 26 is preloaded axially by the contact with the seal 22. In the preloaded state, the axial spacing between the fixing portion 26a and the bearing portion 26b on the side of the internal face 40 of the flange is smaller than the axial spacing between the portions in the free state or unstressed state of the flange.

By elasticity, the connecting portion 26c of the flange tends to return to its position in which it is not loaded or not stressed axially. The bearing portion 26b of the flange therefore exerts a permanent axial preloading force on the ribs 50 of the seal 22. This makes it possible to maintain the axial sliding contact between the flange 26 and the ribs 50 of the seal 22 and to retain lubricant inside the spaces 52.

Figure 3:
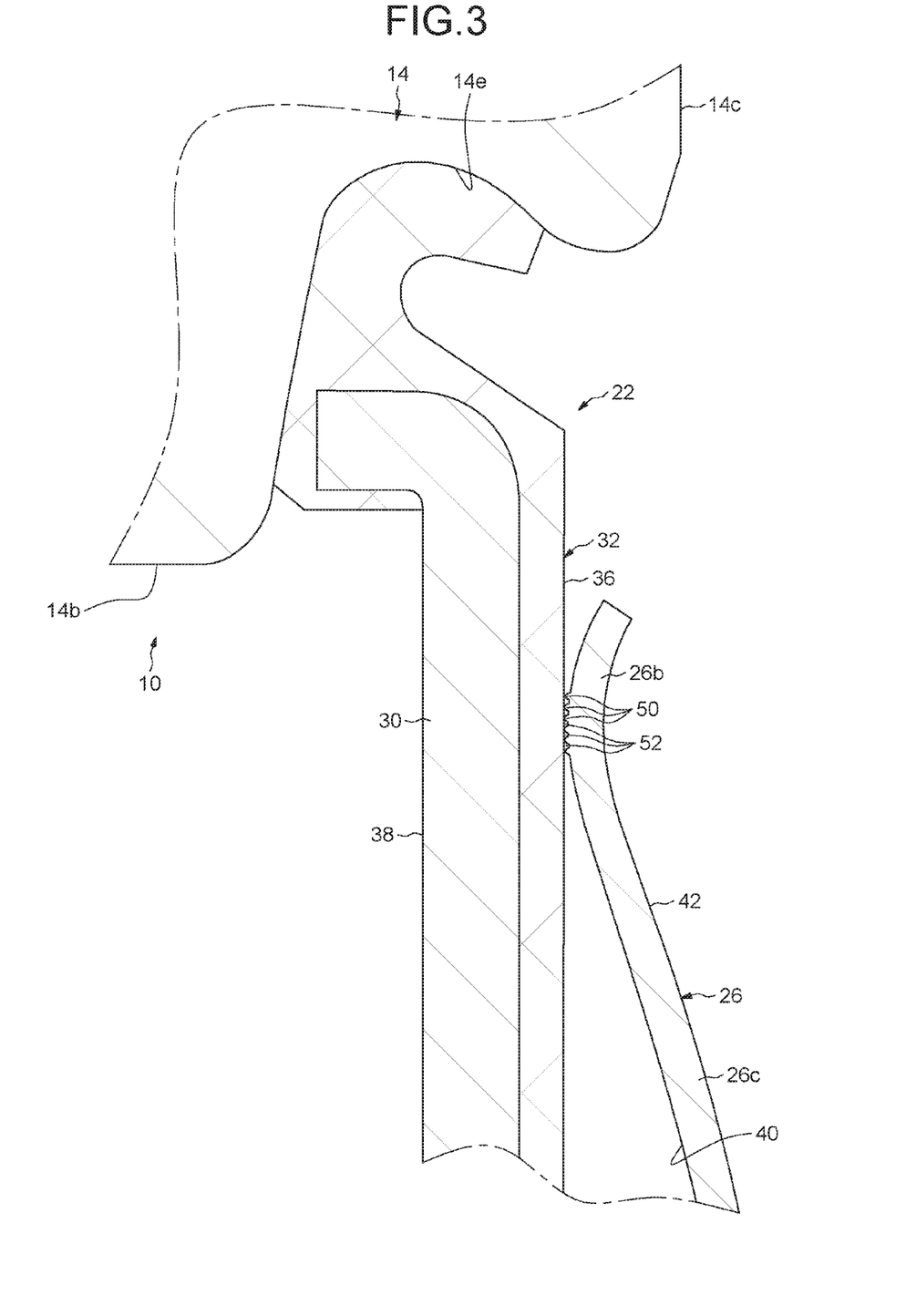
FIG. 3 is a detail view of a rolling bearing according to a second example of the invention.

The example illustrated in FIG. 3, in which identical elements have the same references, differs from the first example described only by way of the reverse disposition of the ribs 50, which is formed here on the flange 26 and against which the seal 22 is mounted axially. The ribs 50 extend inwards in the direction of the seal 22. The ribs 50 extend from the internal side face 40 of the flange and bear axially against the external side face 36 of the seal. The ribs 50 are formed on the bearing portion 26b of the flange.

Figure 4:
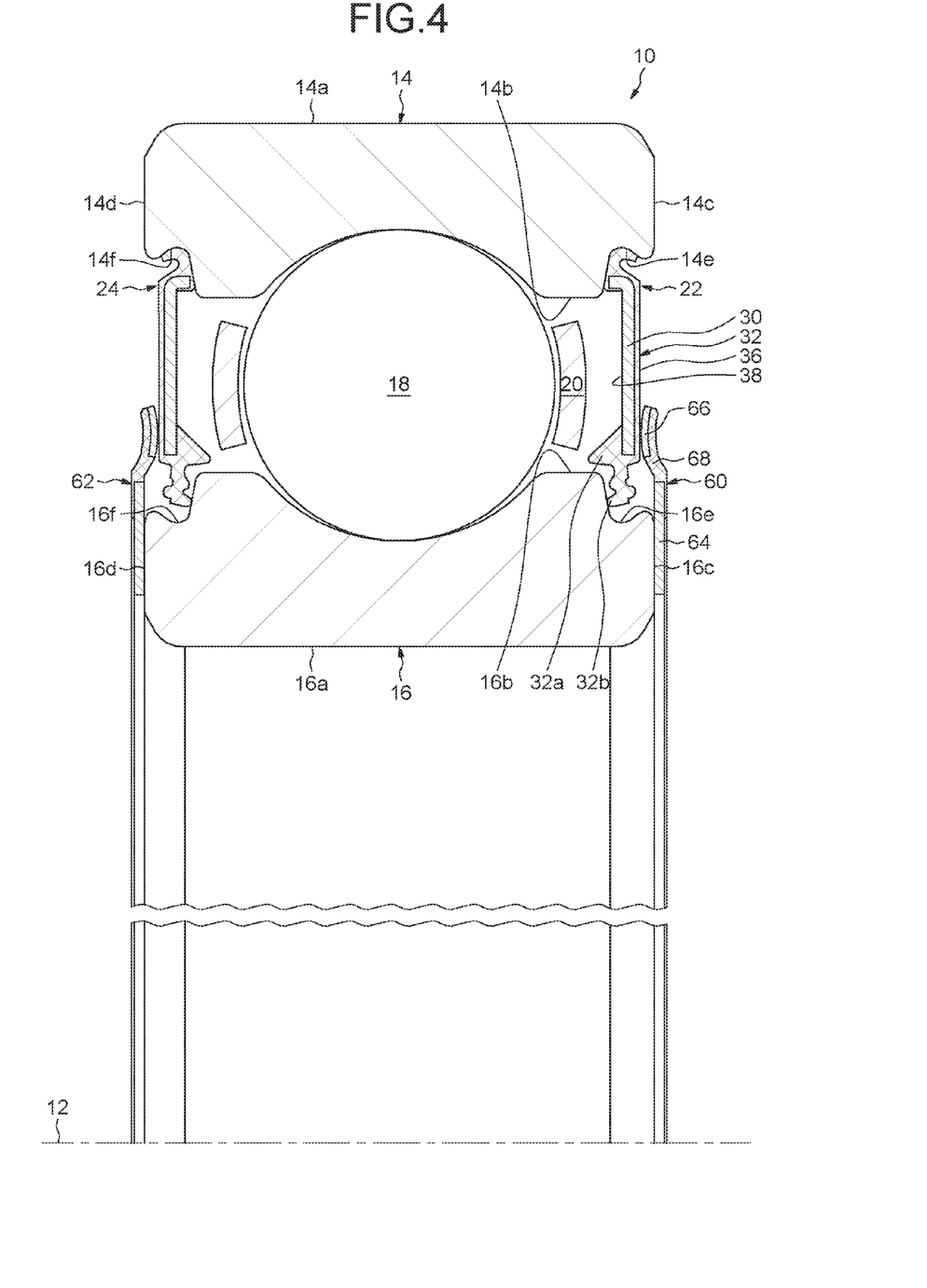
FIG. 4 is a half view in axial section of a rolling bearing according to a third example of the invention.
Figure 5:
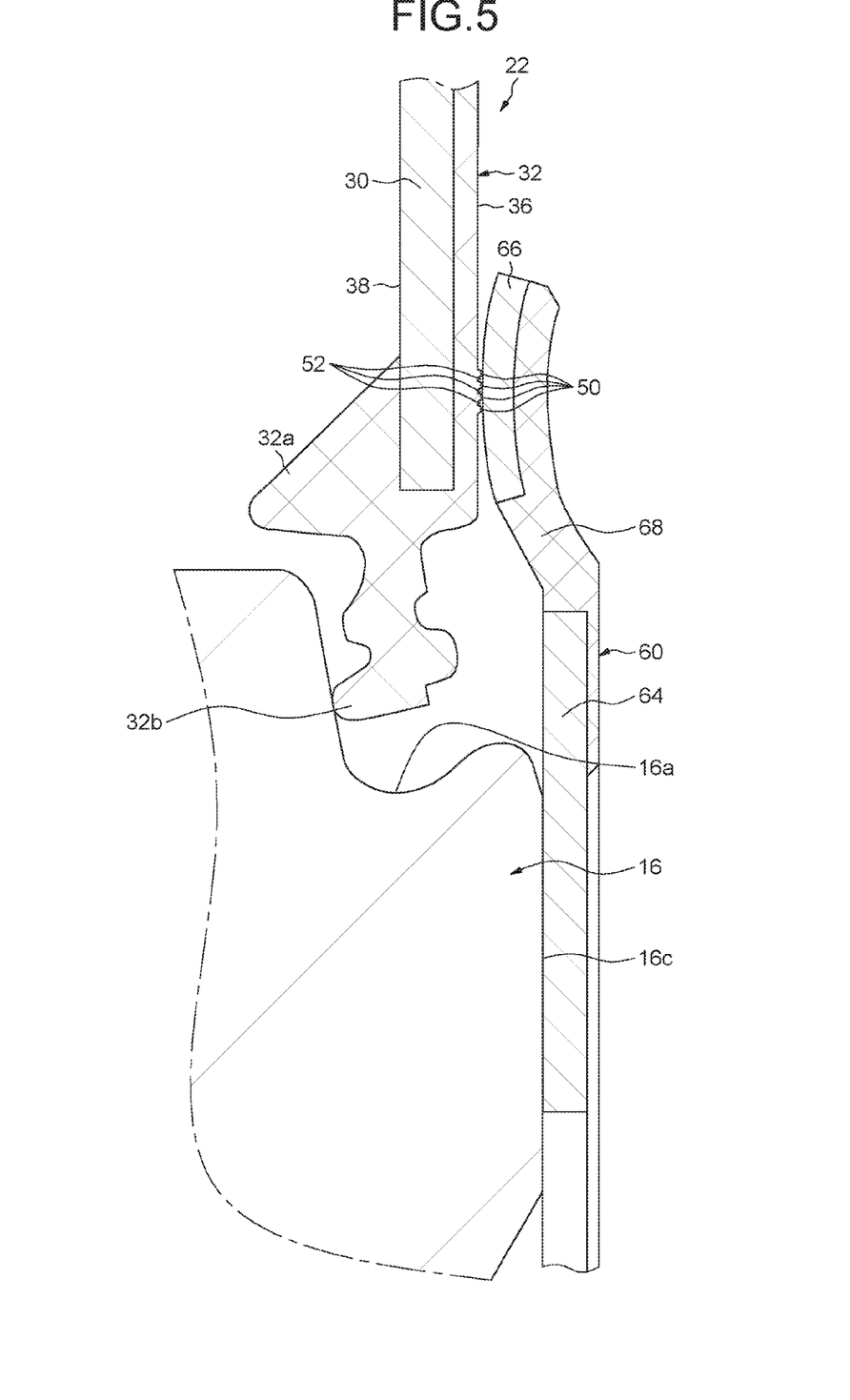
FIG. 5 is a detail view of FIG. 4.

Compared with the first example illustrated, the example in FIGS. 4 and 5, in which identical elements bear the same references, differs mainly by way of the design of the sealing flanges 60, 62 of the bearing. The mounting of each flange 60, 62 against the inner ring 16 and the associated seal 22, 24 is identical to that described in the first example. The relative disposition of each flange 60, 62 with respect to the associated seal 22, 24 differs only in that the flange is mounted so as to bear axially against the ribs of the seal close to the inner sealing portion of the sealing gasket.

Since the flanges 60, 62 are identical in this example, only one of them will be described here. The flange 60 is made in three separate parts. The flange 60 comprises an annular fixing portion 64 mounted so as to bear axially against the front surface 16c of the inner ring, a portion 66 for bearing against the seal 22 which has an annular shape and is in axial contact with the ribs 50 of the seal, and a portion 68 for supporting the bearing portion. The ribs 50 of the seal bear axially against the internal side face of the flange. The ribs 50 are mounted so as to bear axially against the bearing portion 66 of the flange. In this example, there are four of the ribs 50 and three of the closed annular spaces 52.

The fixing portion 64 has a radial shape and forms an inner portion of the flange. The bearing portion 66 forms an external portion or end portion of the flange. In the illustrated example, the bearing portion 66 has a curved shape that is concave axially on the outer side and is convex axially on the inner side. The bearing portion 66 is in the form of a dish. The bearing portion 66 is mounted axially in contact with the ribs 50 of the seal. Only the bearing portion 66 of the flange is mounted in contact with the seal 22. The fixing portion 64 and the bearing portions 66 are each made from a rigid material, for example from metal material, advantageously from a sheet metal blank by cutting and pressing. Alternatively, the fixing portion 64 and the bearing portion 66 could each be made from some other rigid material, for example from synthetic material such as polyamide.

The supporting portion 68 extends between the fixing portion 64 and bearing portion 66. The supporting portion 68 forms a connecting portion connecting the fixing portion 64 and bearing portion 66. The supporting portion 68 covers the large-diameter edge of the fixing portion 64 and the external side face of the bearing portion 66. The internal side face of the bearing portion 66 comes into axial contact with the ribs 50 of the seal.

The supporting portion 68 is designed to be flexible and elastically deformable in the axial direction. The connecting portion 68 extends inwards in the direction of the seal 22. In the illustrated example, the supporting portion 68 has a curved shape that is concave axially on the outer side and is convex axially on the inner side. The supporting portion 68 is molded or vulcanized onto the fixing portion 64 and the bearing portion 66. The supporting portion 68 is made from a flexible material, for example elastomer such as a nitrile rubber or thermoplastic elastomer material.

The supporting portion 68 is deformed axially towards the outside of the bearing by the contact between the bearing portion 66 and the ribs 50 of the seal 22. The supporting portion 68 is deformed counter to its inherent elasticity. The flange 26 is preloaded axially by the contact with the seal 22. In reaction to the deformation of the bearing portion 66, the latter exerts a permanent axial preloading force on the ribs 50 of the seal 22.

In this example, the ribs 50 are formed by the seal 22. As a variant, it may be possible to form the ribs 50 on the bearing portion 66 of the flange and to provide axial contact between these ribs and the external side face 36 of the seal.

In the illustrated examples, each sealing flange is fixed to one of the front surfaces of the inner ring. Alternatively, it may be possible to provide for each flange to be fixed to the inside of an annular groove formed in the bore of the inner ring, for example by crimping.

In the illustrated examples, each seal comprises two parts, namely a reinforcing insert and a sealing gasket fixed to this insert and provided with at least one friction lip that engages with the inner ring so as to form a dynamic seal. Alternatively, the sealing gasket could comprise only one or a plurality of lips of the labyrinth type engaging with the inner ring. In one variant, it may also be possible to provide a seal comprising one part, namely the reinforcing insert or the sealing gasket.

In the illustrated examples, each flange is elastically deformable in the axial direction so as to maintain the axial contact between the ribs and the associated seal or flange. As a variant, it may be possible, however, to provide flanges that are not elastically deformable.

In the illustrated examples, either each seal or each flange comprises ribs for defining the annular spaces filled with lubricant. As a variant, it may be possible to provide, on each seal, ribs in axial contact with the associated flange and at the same time ribs on the flange in axial contact with the seal.

In the illustrated examples, the sealing flange is fixed to the inner ring and the associated seal is fixed to the outer ring. Alternatively, it may be possible to provide a reverse disposition with the seal fixed to the inner ring and the associated flange fixed to the outer ring.

What is claimed is:

1. A rolling bearing comprising:
    an outer ring;
    an inner ring;
    at least one row of rolling elements that is disposed radially between the rings;
    at least one seal forming a first sealing element that is fixed to one of the rings and engages with the other ring;
    at least one flange forming a second sealing element that is fixed to the other ring and is offset axially with respect to the seal on the outer side of the bearing,
        wherein at least one of the first sealing element and second sealing element comprises at least two annular ribs,
        wherein the other sealing element is mounted axially in contact therewith,
        wherein at least one closed annular space is delimited by the ribs and by the other sealing element; and
    at least one lubricant disposed inside the at least one closed annular space.

2. The rolling bearing according to claim 1, wherein the flange is elastically deformable at least in part in the axial direction,
    wherein the flange is deformed axially by the axial contact with the seal.

3. The rolling bearing according to claim 1, wherein the thickness of each rib decreases in the direction of its free end which is in axial contact with the other sealing element.

4. The rolling bearing according to claim 1, wherein the ribs extend axially.

5. The rolling bearing according to claim 1, wherein the ribs are identical to one another.

6. The rolling bearing according to claim 1, wherein the ribs are in one piece with the sealing elements.

7. The rolling bearing according to claim 1, wherein the ribs are formed on an external side face of the seal.

8. The rolling bearing according to claim 7, the seal further comprising at least one sealing gasket delimiting the external side face.

9. The rolling bearing according to claim 1, wherein the ribs are formed on an internal side face of the flange.

10. The rolling bearing according to claim 1, the flange further comprising a portion bearing on the seal which has a convex shape axially on the side of the seal.

* * * * *